Figure 1:
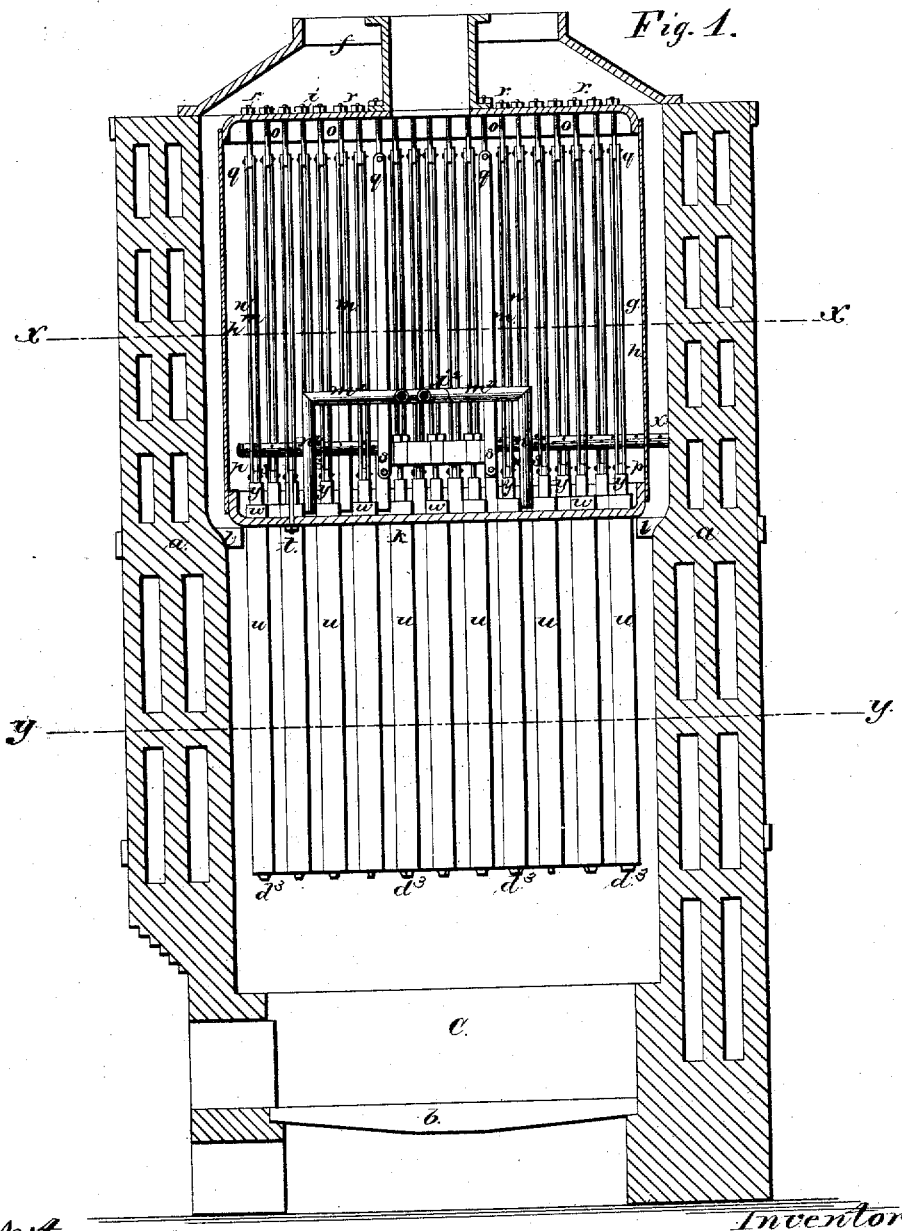

2 Sheets—Sheet 1.

G. T. McLAUTHLIN.

STEAM GENERATOR.

No. 7,331.

Reissued Oct. 3, 1876.

Witnesses:
Geo. Bacon
Fred R. Goodridge

Inventor:
George T. McLauthlin
by Wm. A. Pinckel
Asso. Atty.

2 Sheets—Sheet 2.

G. T. McLAUTHLIN.

STEAM GENERATOR.

Reissued Oct. 3, 1876.

No. 7,331.

Witnesses:
Geo. Bacon
Fred. R. Goodridge

Inventor:
George T. McLauthlin
by Wm. H. Dinkel
his Atty.

UNITED STATES PATENT OFFICE.

GEORGE T. McLAUTHLIN, OF BOSTON, MASSACHUSETTS.

IMPROVEMENT IN STEAM-GENERATORS.

Specification forming part of Letters Patent No. 166,398, dated August 3, 1875; reissue No. 7,331, dated October 3, 1876; application filed September 18, 1876.

*To all whom it may concern:*

Be it known that I, GEORGE T. McLAUTHLIN, of Boston, in the county of Suffolk and State of Massachusetts, have invented certain Improvements in Steam-Generators; and I do hereby declare that the following, taken in connection with the drawings, which accompany and form part of this specification, is a description of my invention, sufficient to enable those skilled in the art to practice it.

My invention relates to certain details of construction of steam-generators of that class in which a series of water-tubes depend from the crown-sheet of a water and steam-chamber into the fire-box or chamber, each tube having within it, or inclosing, an inner tube to effect a circulation, and secure a thin sheet or tube of water in contact with the inner side of the heated tube, and between it and the water circulating or inner tube.

The drawing represents a steam generator or boiler embodying my improvements.

Figure 2:
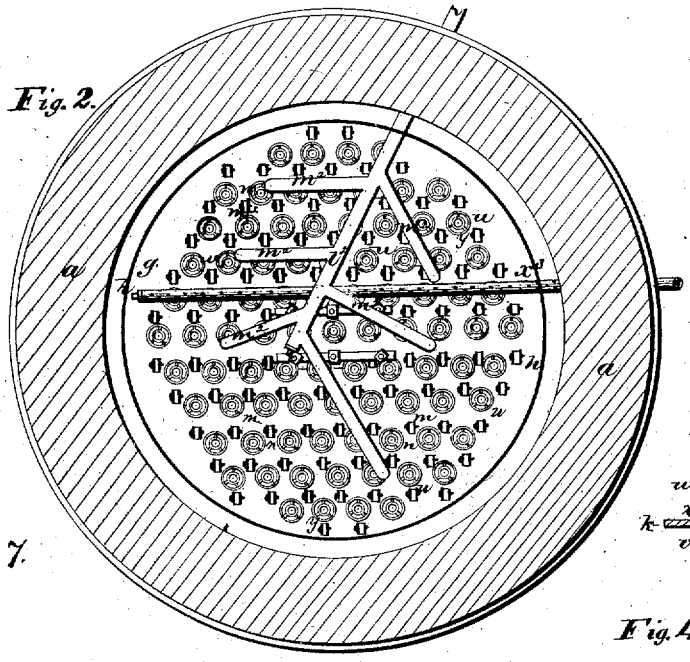
Figure 5:
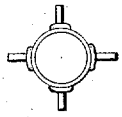
Figure 4:
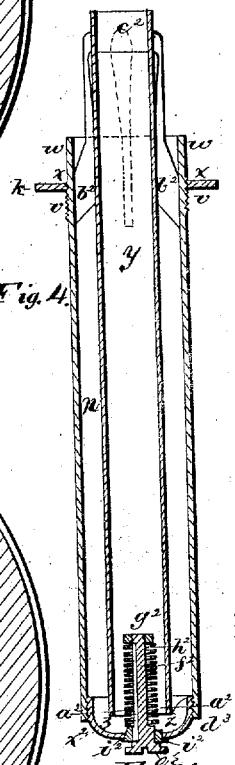
Figure 3:
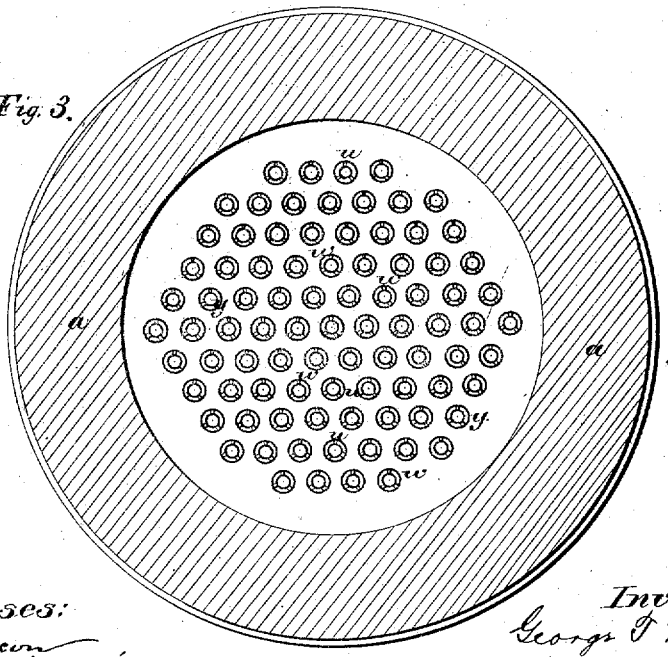
Figure 6:
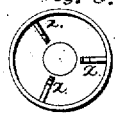

Figure 1 represents, in vertical section, a steam-generator provided with my improvements; Fig. 2, a sectional plan thereof, on line *x x*, Fig. 1; Fig. 3, a sectional plan on line *y y*, Fig. 1; Fig. 4, a vertical central section of one pair of the steam and water tubes, tube-holder, tube-casing, plug, and safety-valve, and a small section of the crown-sheet *k;* Fig. 5, a plan or top view of one of the tube-holders; Fig. 6, an interior top view of the tube-closing plug, and Fig. 7 a section of a modified form of outer and inner tube.

*a* denotes the brick-work or casing of the furnace; *b*, the gates; *c*, the fire-pot and chamber; *d*, the chimney or flue.

In the upper part of the chamber *c* is located the main water and steam chamber *g*, having a side casing, *h*, (around which the flames and other volatile products of combustion course in their passage from the fire-pot to the chimney,) and upper and lower crown-sheets *i k*. The cylinder rests upon suitable supports *l* projecting from the furnace-wall, and the upper and lower sheets *i k* are connected by a series of ties, *m n*, and bolts *o p*, each pair *m n* of the ties being connected to the upper sheet by an eyebolt, *o*, the head of which is fastened to the ties by a pin, *q*, and the screw-threaded end of which is fitted into the sheet, and is further secured by a nut, *r*, and to the lower sheet by a similar eyebolt, *p*, pin *s*, and nut *t*.

Each of the ties is made of thin strap-iron, and by thus giving to each large superficies (or by any means exposing sufficient surfaces) I secure, in combination with the boiler-braces, surfaces against which the water in the steam-room is attracted, and down which it drips, the distributing of these metal surfaces throughout the chamber thus attracting or affording lodging-surfaces for all particles of water, and tending to keep the steam dry.

The ties are all of equal length, so that when they, or any of them, are removed (by knocking out their pins) for access to the chamber, they may be interchangeably replaced, each fitting in any place, and to any of the bolts.

These flat-iron or strap-iron ties, thickly interspersed, making them of equal length and interchangeable, and connecting the sheets or heads of the cylinder by the straps, bolts, nuts, and pins, are features of my invention.

From the crown-sheet depend the water-tubes *u*. Each tube extends down well into the fire-chamber, and hangs free therein, being secured in place only by its connection at the top with the crown-sheet. Each is connected to the crown-sheet by a screw-thread, *v*, near its upper end, working in a nut-thread in the sheet. Each opens into the chamber *g*, and the open end *w* of each projects a short distance above the inner surface of the sheet, as seen in Figs 1 and 4, so that sediment and calcareous deposits shall lodge upon the sheet, and not be drawn into the tubes.

To effect the connection of the tubes to the crown-sheet, with its end so projecting up above the sheet, without having to screw it through into position, I turn down each tube, as seen at *x*, or enlarge the tube at the screw-threaded portion, so that the extreme upper end of the tube slips through the nut-threaded hole in the sheet, and the screw-thread only extends over sufficient surface to fasten the tubes.

The lower end of each tube *u* is closed by the plug $d^3$, Fig. 4, and within each tube *u* is another central tube, *y*, the bottom of which rests upon centering and supporting rings *z*, projecting from the plug $d^3$, the tube *u*, or the tube *y*, leaving a free water-passage from tube to tube, as shown at $a^2$, while the upper part is centered by the tube-holder having springs $b^2$, extending from an encompassing ring, $c^2$.

The upper end of each tube $y$ projects some distance above the tube $u$, so as to effect a circulation of solid water down tubes $y$, the steam generated between the inner tube and the outer tube, parting from the water when it leaves the mouth of the large tube, spreading into the space between the projecting tubes $y$, and passing up into the steam-space, leaving the solid water to return through tube $y$.

Each circulating-tube $y$ may be removed from the tube $u$, either through the top thereof into the steam-room, or through the bottom into the fire-pot, (the plug being in the latter case first removed,) and, in like manner, the circulating-tube may be replaced or put into the outer tube.

When the tube $y$ is entered at the top of the tube $u$, its bottom self-centers, or is guided by the radial wings $z$, and in entering from the bottom of the ring and its wings, are used to centrally locate the upper end, while the lower end is centrally located by securing the plug in place, (if the plug be made with the guide-wings,) or by any other suitable guiding devices.

The plug $d^3$, that closes the bottom of each tube $u$, is a peripherally screw-threaded cap or head, the screw-thread of which enters a nut-thread in the lower end of the tube.

At the center of the plug is a safety-valve, $e^2$, said valve being attached to the outer end of a pin, $f^2$, at whose inner end is a nut, $g^2$, the stress of a suitable spring, $h^2$, acting upon this nut, closing the valve. The power of this spring is such that the pressure of the steam upon the valve compresses the spring and opens the valve when the pressure of the steam exceeds the limit of working pressure or approaches an unsafe pressure.

The valve-seat is on a screw-threaded ring, $i^2$, that screws into the plug.

The spring $h^2$ is a coiled spring, and is cast in shape as shown in the drawing. The spring $h^2$, spring-stand $x^2$, and the seat-ring $i^2$ are cast in one piece.

The space between the seat-ring and valve at its periphery is arranged for the purpose of receiving the end of a forked lever, by which the valves can be opened, when desired, to drain the tubes, these valves serving the double purpose of safety-valves and tube-drainers.

Instead of such construction, the inner tube, or part of it, may be cast in the form of a tubular coiled spring, or it may be made of flat metal bars, coiled so as to form a tube, in either case having a cross-bar at its lower end, connecting by a central screw, with a head or cap, the edge of which abuts against the end of the main tube, the abutting edges being ground to make a tight joint. The upper end of such inner tube has lugs, which rest upon the upper end of the main tube.

Figure 7:
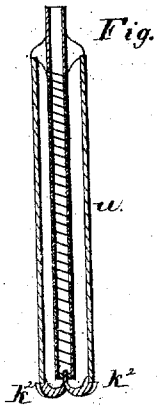

When the pressure of the steam exceeds the limit of working-pressure, the steam presses down the cap, (the coils of the inner tube opening,) and the water escapes upon and extinguishes the fire. This modification is represented at Fig. 7.

The inner tube is so made that there is no space between the adjacent coils to disturb the circulation, while the pressure of the steam (below or near a safety-pressure,) forces down the cap by opening the spring.

To drain the water from the tubes, the cap may have projecting lugs $k^2$, by prying over which the cap may be forced down slightly, so that the water can escape, this arrangement of the tube and cap affording the double purpose of safety-valve and draining-valve.

Over the tubes $u$, through the water and steam-room, and its system of ties, a blow-off pipe, $l^2$, extends, with suitable branches $m^2$, having vertical arms $n^2$, which pass down close to the surface of the crown-sheet. Their open ends are between nests of tubes, and, in blowing off, any deposits upon the sheet are drawn into the pipes and blown into the atmosphere, thus preventing deposits from accumulating, and from re-entering the water-tubes.

By proper use of this blow-off mechanism the internal surfaces of the boiler, its crown-sheet, and the tubes, are all kept clean and free from injurious deposits, as the blow-off pipes take the dirt and deposits from the only lodging-place they have, and before they become incrustations.

By my arrangement and construction of the tubes the fire-pot may be entered, and each plug, or any particular plug, may be withdrawn from each or any one of the tubes $u$, and the inner tubes, each or either, or all of them, may be removed, the same being also the case with the main tubes. In like manner each pair, or any one or more of the pairs, of ties may be removed from the steam-room, and any one or more of the circulating tubes may be removed for examination thereof, or for examination of the main tubes. Thus the whole boiler and every part of it are alike accessible for repairs, examination, or cleaning, and the boiler may be taken to pieces or put together with the greatest ease, and with ordinary skilled labor, and in a very short time.

The feed-pipe $x^3$ or distributer for supplying the boiler or generator with water extends across the cylinder, and is perforated with a number of small holes, so arranged as to discharge the water upward. With a supply-pipe so perforated there is no liability of bursting the generator by the introduction of water, should the water in the generator be exhausted, for the water discharged from the distributer in a number of small streams and upward is quickly formed into steam. By inserting the plug $d^3$ within the depending tube I afford an additional means of safety. The screw-thread cut in the end of the tube weakens it at that point, and pressure beyond the safety-point would allow the tube, it not being held externally, to stretch out. This would not be the case with an encircling-cap.

I have described that the small safety-valves at the ends of the depending tubes open when the pressure of the steam exceeds the limit of working pressure, or approaches an unsafe pressure. The working pressure of the steam is set or regulated by the ordinary safety-valve, and these small valves at the ends of the tubes are set so that they will not blow off until above the working pressure; then, should the regular safety-valve become inoperative, these small valves yield one by one, according to the pressure of steam required to overcome their springs, and they then discharge the water on the fire, and in this way the failure of the safety-valve to act does not result in destroying the boiler; and further, if the regular safety-valve is overloaded to such a degree as might burst the boiler, the small valves, being set at a pressure below unsafe pressure, will blow off, and extinguish the fire.

I claim—

1. The removable ring $c^2$ and its springs $b^2$, combined with the main depending and the circulating tubes for centering and holding the upper end of the circulating-tube, substantially as set forth.

2. The main depending tube $u$, connected with the crown-sheet by means of screw-threads, as set forth, and the circulating-tube $y$ within the main tube, combined with the removable centering devices, substantially as described, for centering the circulating-tube at bottom and top, as set forth.

3. The outer tube $u$, the inclined projections $z$, and the inner tube $y$, arranged, with relation to each other, substantially as described, and so that the lower end of the inner tube is centered automatically, and its end left unobstructed for the passage of water, as set forth.

4. The outer tube $u$, provided with the removable plug, combined with the inner tube and removable centering mechanism, and arranged, with relation to the steam-chamber and fire-box, so that the inner tube may be removed from the top or the bottom of the outer tube, substantially as described.

5. The combination, with the outer and inner tube, of the safety-valve, arranged to discharge the water on the fire in the fire-box, substantially as described.

6. The combination, with the sheets or heads of a steam-generator, of the removable ties of equal lengths, and adjustable eyebolts, the ties being interchangeable, as and for the purpose set forth.

7. The vertical steam and water cylinder, and the tubes $u$ and $y$, suspended and arranged above the fire-box, and forming no part thereof, and having an open annular space about the cylinder for the passage of the heat and products of combustion, the entire cylinder having an equal exposure, or nearly so, on all sides, substantially as set forth.

GEO. T. McLAUTHLIN.

Witnesses:
G. W. GREGORY,
W. J. PRATT.